(Model.)
H. FIELD, Jr.
HOISTING MACHINE.
No. 244,801. Patented July 26, 1881.
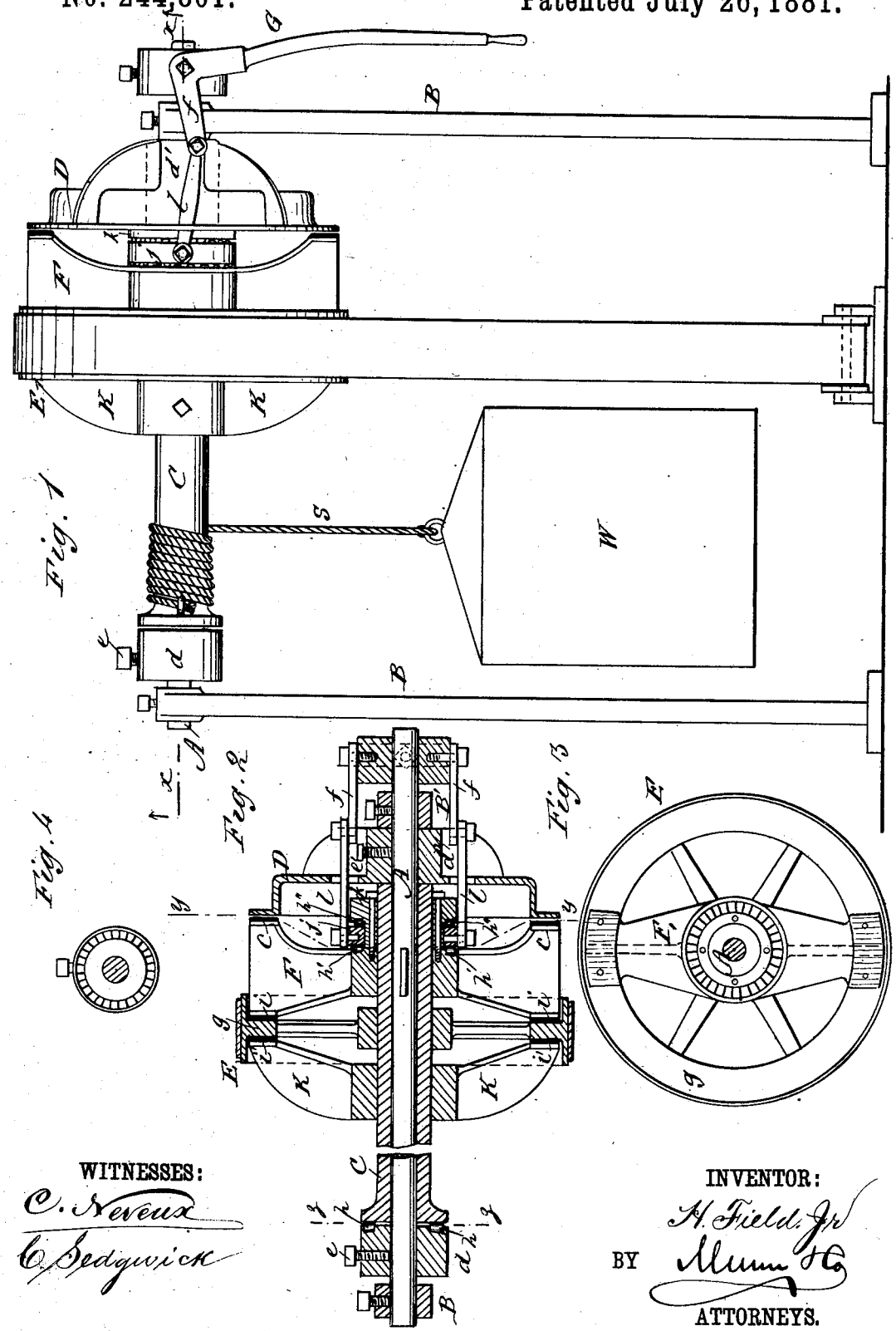

UNITED STATES PATENT OFFICE.

HENRY FIELD, JR., OF NEW BEDFORD, MASSACHUSETTS.

HOISTING-MACHINE.

SPECIFICATION forming part of Letters Patent No. 244,801, dated July 26, 1881.

Application filed June 9, 1881. (Model.)

*To all whom it may concern:*

Be it known that I, HENRY FIELD, Jr., of New Bedford, in the county of Bristol and State of Massachusetts, have invented a new and Improved Hoisting-Machine, of which the following is a specification.

The object of my invention is such construction and arrangement of the parts of my improved elevator or hoisting-machine that, by means of a continuously-rotating wheel or pulley and certain link-and-lever mechanism and certain friction or clutch mechanism, the action of the machine and the weight will always be under sudden and easy control with the outlay of very little power upon the governing-lever.

In the accompanying drawings, Figure 1 is a front elevation of my improved hoisting-machine. Fig. 2 is a horizontal section of the same, taken on the line $x\ x$ of Fig. 1. Fig. 3 is a vertical transverse section taken on the line $y\ y$ of Fig. 2, and Fig. 4 is a similar section taken on the line $z\ z$ of Fig. 2.

Similar letters of reference indicate corresponding parts.

Though I have shown in the drawings a belt and pulley for applying the power to the hoisting-machine, it is obvious that the power might be applied by means of gearing, and that by multiplying the gearing the hoisting capacity of the machine might be greatly increased; and though in the drawings the long axle A is shown supported above the weight W by the uprights B B, it is obvious that it might be suspended from the wall in suitable shaft-hangers or located below the weight, as circumstances may require.

Upon the axle A is placed the loose drum or concave sleeve C, around which the rope $s$ attached to the weight is adapted to be wound, which sleeve is held in position on the axle by the collar $d$ and the perforated dish-shaped friction-disk D, which are fixed upon the axle by the set-screws $e\ e'$, the latter passing through the hub $d'$ of the friction-disk; and upon this drum or sleeve is placed the wheel E, (pulley or cog-wheel, as the case may be,) upon which it freely turns when not clutched by means of the inwardly-projecting annular flange $g$, as hereinafter described.

Between the wheel E and the friction-disk D is placed the brake or friction-clutch F, which is keyed to the drum or sleeve in such manner that it is adapted to have a sliding movement upon the sleeve, but not a rotating.

The sliding movement of the brake is controlled by the bifurcated lever G, the arms $f\!f$ thereof being connected to the loose ring $j$ by the links $l\ l$. The ring $j$ is connected with the brake or clutch by the headed collar $k$, which is bolted to the clutch or brake, the reduced portion of the collar passing through the ring and forming the bearing therefor.

When the brake or clutch is forced forward by the lever the faces $i\ i$ of the brake (which are provided with pieces of leather or similar material) are forced against the flange $g$ of the wheel, which force is supported upon the opposite side of the wheel by the abutment-arms K, which are rigidly fixed to the drum or sleeve, the faces $i'\ i'$ of which reach to the flange $g$, opposite the points where the faces $i\ i$ of the brake come against the ring, as shown. In this manner the drum or sleeve is made to revolve with the wheel and the weight caused to be lifted by the rope being wound upon the drum.

In order to lower the weight or to stop it at any point in its ascent or descent, the brake or clutch is to be brought by the opposite movement of the lever forcibly against the friction-disk D.

The clutch, wheel, lever, friction-disk, &c., are so arranged relative to each other and in such manner that the movement of the lever necessary to clutch the wheel, disengage the clutch from the wheel, and break the rapid descent of the weight, or stop it at any point, is very slight and requires very little power, and thus the action of the machine and the weight are under instant and certain control.

In order to reduce the friction between the ends of the drum or sleeve C and the collar $d$ and ring $j$, I provide the face of the collar with the series of conical anti-friction rollers $h$ and the hub of the brake F with the series of conical anti-friction rollers $h'$, and the head of the collar $k$ with the anti-friction rollers $h''$, which rollers are journaled in conical recesses formed in these parts.

Instead of the link-connection shown and described for connecting the lever with the brake F, it is obvious that a crank or cam or eccentric might be used and not depart from the spirit of my invention.

Having thus fully described my invention, I claim as new and desire to secure by Letters Patent—

1. In hoisting-machines, the sleeve or drum C, in combination with the continuously-revolving wheel E, brake or clutch F, and abutment-arms K, substantially as and for the purposes set forth.

2. The sliding brake or clutch F, in combination with the continuously-revolving wheel and the fixed friction-disk D, the clutch being keyed to the sleeve or drum C, substantially as and for the purposes set forth.

3. The sleeve or drum, having the abutment-arms K secured to it and the brake or clutch F keyed upon it, in combination with the wheel loosely placed upon the drum or sleeve, substantially as and for the purposes set forth.

4. The sleeve or drum C, having the abutment-arms K secured to it and the brake or clutch F keyed upon it and the wheel loosely placed upon it, in combination with the fixed friction-disk D and means, substantially as described, for moving the clutch, substantially as and for the purposes set forth.

5. The sleeve C and the clutch F, provided with the headed collar $k$ and having the anti-friction rollers, in combination with the collar $d$, provided with anti-friction rollers, and the ring $j$, substantially as and for the purposes specified.

HENRY FIELD, JR.

Witnesses:
WM. H. MATHEWS,
CHAS. J. RANDALL.